1

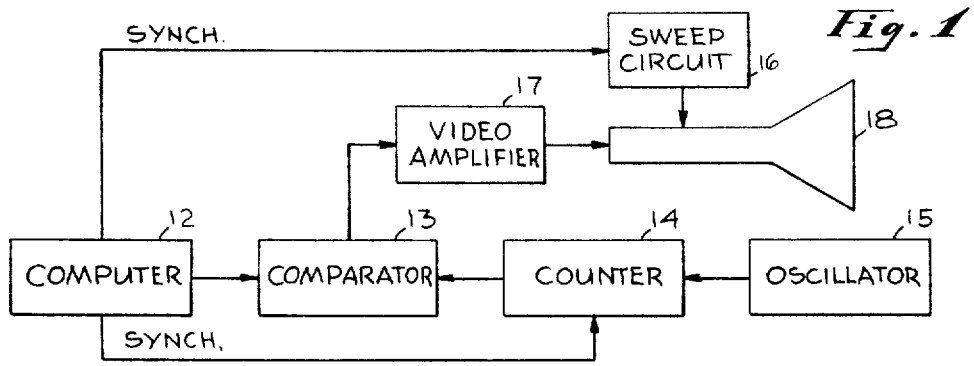
*Fig. 1*
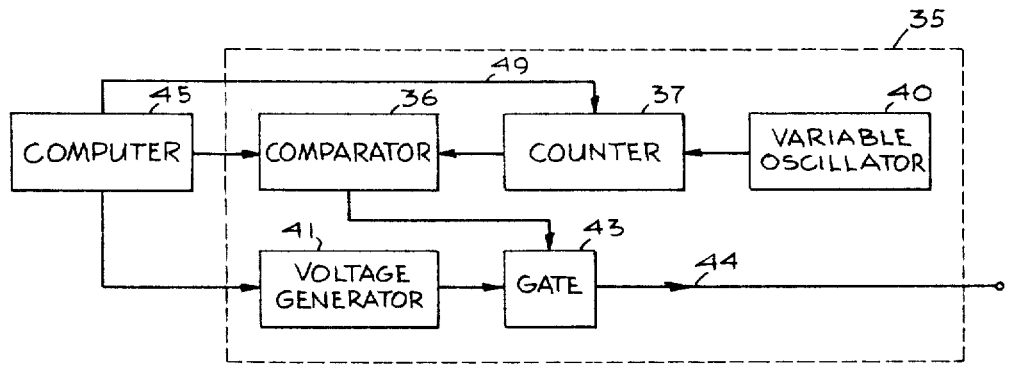
*Fig. 3*
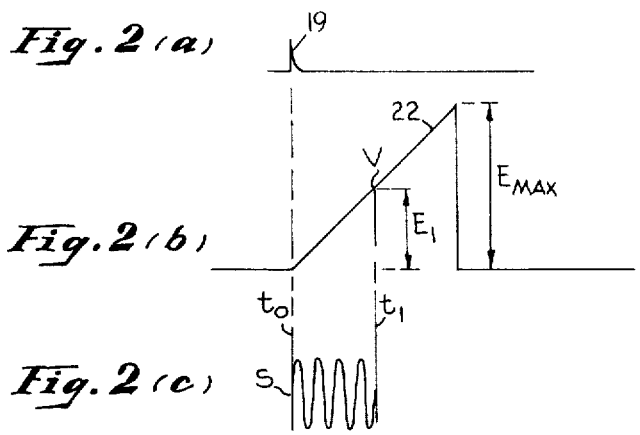
Roy A. Howard
INVENTOR.
BY *Allen M. Sutton*
ATTORNEY United States Patent Office 3,270,337
Patented August 30, 1966

3,270,337
RANGE DISPLAY
Roy A. Howard, Woodland Hills, Calif., assignor, by mesne assignments, to The Bunker-Ramo Corporation, Stamford, Conn., a corporation of Delaware
Filed July 25, 1963, Ser. No. 297,499
20 Claims. (Cl. 343—5)

This invention relates to a radar range display system and more particularly to a display system useful in displaying information similar to radar target range which is available in digital form.

The importance of radar in our modern society is manifest by its wide use both for civilian and military purposes. Basically, a radar system employs radio waves to determine the direction and distance of objects from the radar equipment. Radio waves transmitted by a directional transmitting antenna of a radar set travel towards the object which, upon being struck by the waves, reflects back a portion of their energy which is in turn received by the radar set. The position of the directional transmitting antenna at the time of transmission indicates the general direction of the object from the radar set, while the time interval between the transmission of the radio waves and the reception of a portion of their energy which was reflected back by the object is a function of the distance or range of the object from the radar set.

The electronic information relating to the direction and range of any detected object is generally used to energize a display apparatus and its associated circuitry so that the relative position of the object with respect to the radar set may be visually observed and studied. In some radar systems, the radar information is coded and supplied as input signals to storage means such as a computer for future study and analysis.

The display apparatus most commonly used in radar systems is a cathode ray tube having a deflectable electron beam and a display surface. The electron beam deflection is so controlled that the position of a light spot created by the beam on the display surface is a function of the radar information. The display of such information may be presented in several different modes, each mode being designated by a letter as is well known by those versed in the art. In one method of presentation known as type B, the horizontal position of the electron beam on the surface of the display tube indicates an azimuth angle, defined as the angle between the direction of the earth's magnetic north pole and the direction of the detected object, while the vertical position of the beam indicates the range or distance of the detected object from the radar set. In radar presentation type P, known as plan-position-indication (PPI), the radial displacement of the light spot from the center of the screen indicates range, and the direction of the radial displacement indicates azimuth angle as defined above, with the center of the screen indicating the location of the radar set.

However, independent of which method of radar presentation is used, it is necessary to convert the range information, which is a function of the travel time of the radio waves to and from a target, to analog voltages which are suitable for controlling the electron beam of the display device to give an indication of the object at the correct range. Whenever it is desired to retain the radar information for future study and analysis, means must be furnished to store the information so that it will be available at a future time. A digital computer having the memory capacity to retain the required amount of coded information may be used for such a purpose, the radar information being converted to related digital numbers which are entered into the computer memory so as to be available in the future upon command. However, the

2 output of such a digital computer will be in digital form which needs to be converted to an analog voltage before it can be used by the range display as discussed above, thereby requiring a digital-to-analog converter to be associated with the computer. The present invention provides a radar range display system embodying a novel digital-to-analog converter that is characterized by simplicity and accuracy.

The apparatus of the present invention, in which analog information may be obtained from prestored data in digital form, is based on numerical comparison techniques whereby prestored range data in digital form is compared to a count developed by a counter, which count increases linearly as a function of time. When the increasing count and the digitally coded range data are numerically equal, a pulse energizes a display circuit which is so synchronized with the counter that it displays a point at a distance from predetermined references which is proportional to the range data previously stored in digital form.

The apparatus embodying the present invention may incorporate a digital computer wherein radar information related to the target range of an object is stored in the form of a digital number. The number represents the total time necessary for radio waves to have travelled from the radar set to the object and back to the set, each digit of the number representing 1.544 microseconds, which is the time necessary for the radio waves to have travelled one-quarter nautical mile. (It is assumed that the speed of radio waves in air is substantially equal to the speed of light.) An oscillatory circuit in the apparatus generates pulses at a frequency of 647,500 cycles per second, the period of the pulses being 1.544 microseconds, which equals the time period represented by each digit in the digital number in the computer. It seems clear, therefore, that the time necessary for the oscillatory circuit to generate pulses equal in number to a digital number stored in the computer is the same as the time represented by the stored digital number, which is the total time necessary for the radio waves to have travelled from the radar set to the object and back to the set. The pulses from the oscillatory circuit are counted up by a counter which, together with a deflection circuit known as a sweep circuit, are synchronized by the digital computer. A synchronizing pulse from the computer causes the counter to reset itself to zero and start a new count of pulses supplied to it by the oscillatory circuit. The synchronizing pulse from the computer also causes the sweep circuit to start generating a linearly increasing sawtooth voltage waveform, which in turn deflects the electron beam of the display tube with respect to fixed references on the display surface. When the increasing count in the counter equals the digital number received from the computer, a pulse is transmitted to a video amplifier associated with the display tube, so that the electron beam causes a bright spot to appear on the surface of the display tube at a distance from the fixed reference controlled by the digital number (range) received from the computer.

For further objects of this invention and for a better understanding thereof, reference is made in the following description to the accompanying drawings in which:

FIG. 1 is a block diagram of one embodiment of the present invention;

FIG. 2 represents waveforms present in the apparatus embodying the present invention; and FIG. 3 is a block diagram of another embodiment of the present invention.

Reference is now made to FIG. 1 which shows a block diagram of one embodiment of the present invention. A computer 12 shown therein is assumed to store range information of a target in digital form, which upon command is supplied to one input terminal of a comparator 13. Another input terminal of the comparator is connected to a digital counter 14 which counts up signals supplied thereto from a fixed frequency oscillator 15. The frequency of oscillation of the oscillator is related to the range information represented by each digit of the number stored in the computer 12. As previously explained, if each digit in the stored number represents the time necessary for radio waves to travel a round trip of one-quarter nautical mile, namely 1.544 microseconds, then the frequency of oscillation will be 647,500 cycles per second, so that the period of each cycle equals 1.544 microseconds. Generally it may be stated that if each digit of the number stored in the computer represents N nautical miles of target range (2N nautical miles of round trip travel of the radio waves), the frequency to be chosen is defined as $80937.5 \times 1/N$ cycles per second. The comparator 13 compares the signals from the computer 12 with the signals from the counter 14 and when the signals from the two sources are numerically equal, a pulse is sent by the comparator to a conventional video amplifier 17. The amplifier 17 is associated with a display device 18 such as a cathode ray tube, having a phosphor-coated display surface, an electron gun for providing an electron beam, means for deflecting the beam, and means for blanking and unblanking the beam. The output of the amplifier 17 is provided to the blanking and unblanking means so that the electron beam of the tube causes a bright spot to appear on the surface of the display in response to each output pulse from the comparator 13. However, the position of the bright spot is controlled by a sweep circuit 16 which generates the voltages or currents necessary to deflect the electron beam to the desired position, as is well known in the art.

In the embodiment of the invention shown in FIG. 1, both the sweep circuit 16 and the counter 14 are synchronized by the computer 12 so that the counter starts counting pulses received from the oscillator 15 while the sweep circuit 16 starts generating voltages which deflect the electron beam across the display surface of the tube 18. However, the beam remains blanked, that is, it provides no visible display, until such time as the comparator 13 energizes the video amplifier 17, which in turn unblanks the electron beam as previously described.

The interrelationship of the various circuits of the apparatus as described can further be clarified by reference to FIGS. 2(a), 2(b), 2(c) and 2(d) wherein various waveforms are shown. In FIG. 2(d), a waveform 21 represents the output waveform of oscillatory circuit 15 which energizes counter 14. At some time shortly prior to time $t_0$, the computer 12 is assumed to supply its stored digital number to the comparator 13, and at time $t_0$ the computer 12 triggers both the counter 14 and the sweep circuit 16 with a synchronizing pulse 19 of FIG. 2(a). Counter 14 resets itself to start a new counting cycle designated as point S as shown in FIG. 2(c) while sweep circuit 16 starts generating the voltages necessary to deflect the electron beam across the surface of the display tube 18, as shown by a line 22 in FIG. 2(b).

The apparatus will remain in this state with the electron beam being increasingly deflected and the counter 14 counting until at time $t_1$ the count in the counter equals the digital number in the comparator 13, which causes the comparator to energize the video amplifier 17. In FIG. 2(c), the count is represented by four cycles which are shown for purposes of illustration only, since it may involve any number of cycles up to the number representing the maximum range to be displayed. The video amplifier supplies the necessary signals to the electron gun of the display tube 18 so that the electron beam is unblanked, causing a bright spot to appear on the display surface. However, the position of the spot on the display surface is a function of the deflection voltage supplied to the display tube 18 by the sweep circuit 16 as well as the digital number representing range. The rate of the linear voltage change of the sweep circuit is controlled, so that the maximum voltage as represented by $E_{max}$ in FIG. 2(b) is of sufficient amplitude to deflect the electron beam across the display surface to represent the maximum displayable range. If the output sweep voltage of sweep circuit 16 is less than $E_{max}$ but greater than zero, the electron beam would then be deflected to less than the maximum radial displacement, the exact degree of deflection being a function of the sweep voltage. In the example described above, the sweep voltage at time $t_1$ is $E_1$, designated as point V on line 22 of FIG. 2(b). The amplitude of $E_1$ is assumed to be equal to one-half the maximum sweep voltage $E_{max}$; therefore, the electron beam would only be deflected to one-half the maximum radial displacement of the displayable deflection at the time it is unblanked.

Although reference has been made to sweep voltages, thus presuming electrostatic deflection of the beam in the display tube, it is to be understood that the invention also contemplates electromagnetic beam deflection. In that case, the output of the sweep circuit 16 would be "sweep currents," rather than "sweep voltages."

The foregoing example is presented for explanatory purposes. However, on the basis of that description, it seems clear that the apparatus embodying the present invention, by employing digital comparison techniques, enables the analog presentation of radar range data from previously stored digital information without resort to conventional digital-to-analog converters.

In another embodiment of the present invention, the basic principles of controlling the functional interrelationship of the computer 12, the comparator 13, the oscillator 14 and the counter 15 are incorporated in a novel variable digital-to-analog converter, wherein input signals in digital form are converted to analog signals, the amplitude of the analog signals being adaptable to manual preselection.

Referring now to FIGURE 3, there is shown in block diagram form a variable digital-to-analog converter of the invention, generally designated by reference numeral 35 and comprising a comparator 36 which is connected to a counter 37. The counter 37 is also connected to a variable frequency oscillator 40. The variable digital-to-analog converter 35 further comprises a voltage generator 41 having its output voltage signals supplied to a gate 43 which controls the presence of any output signals of the converter 35 on an output line 44. A computer 45 supplies digital numbers to the comparator 36 and synchronizing signals to the counter 37 and voltage generator 41.

The oscillator 40 is a free-running oscillator for generating output signals at predetermined frequencies. The amplitude and shape of the signals are properly controlled so that the signals may be detected and counted by the counter 37, which in turn supplies signals to the comparator 36, the signals being a function of the count therein.

The voltage generator 41, upon being triggered by a pulse from the computer 45, starts generating a sawtooth shaped voltage signal. The gate 43 is connected to the comparator 36, which opens the gate only when the signals from the counter 37 and the computer 45 which are compared therein are numerically equal.

The novel features of the variable digital-to-analog converter may further be explained by the following example wherein a digital number stored in the computer, which is to be analogically represented, is supplied by the computer to the comparator 36. At some instant in time shortly thereafter, the computer 45 triggers the voltage generator 41, thereby initiating the generation of a sawtooth shaped voltage signal therein. Simultaneously with triggering the voltage generator 41, the computer 45 also resets the counter 37 through reset line 49, so that a new count of the signals received from the variable frequency oscillator 40 starts from zero. The count in the counter 37 increases at a rate which is a function of the frequency of oscillation of the oscillator 40. When sufficient time has elapsed that the count in the counter as supplied to the comparator 36 numerically equals the digital number supplied to the comparator 36 from the computer 45, an output pulse from the comparator opens the gate 43, so that the sawtooth voltage output signal of the voltage generator 41 present at that particular instant is directly coupled to the output line 44 of the digital-to-analog converter.

From the foregoing description, it is apparent that the amplitude of the output signal of the digital-to-analog converter on the line 44 is directly a function of the time necessary for the counter 37 to count up signals from the oscillator 40 equal in number to the digital number supplied by the computer 45 to the comparator 36. The frequency of oscillation of the variable oscillator 40 is chosen to equal the largest number stored in the computer, divided by the period of generation of each tooth in the sawtooth voltage output signal of the voltage generator 41. Assuming that the largest number in the computer 45 is 1000 and that the period for generating one tooth in the sawtooth voltage signal is one-hundredth of a second, the variable frequency oscillator 40 is set to generate countable pulses at a frequency of $1000 \div \frac{1}{100} = 100{,}000$ pulses per second. Clearly, if the largest number stored in the computer is varied from 1000 or if the period of generation of the sawtooth voltage signal changes, the frequency of pulses of the variable oscillator 40 may be changed to balance the interrelationship of the pulses in the variable digital-to-analog converter, thereby providing a variable digital-to-analog converter.

In still another embodiment of the invention, the rate of change of voltage amplitudes of the sawtooth shaped voltage signal generated by the voltage generator 41 may be varied, thereby varying the ratio of digital signal to analog output. It is apparent, therefore, that by selecting the frequency of generation of pulses by the variable frequency oscillator 40, and by selecting the frequency and amplitude of the sawtooth voltage waveform generated by the voltage generator 41, different ratios of digital input signals to analog output signals may easily be obtained.

It is now apparent that the invention provides a method which is highly accurate and an apparatus which is relatively inexpensive and simple in design and construction. When used in conjunction with radar range display, the apparatus converts a digital signal stored in a computer to an analog signal which actuates a display wherein the degree of radial displacement of the display on a display surface represents the range or distance of the radar target from the radar set. The invention teaches a novel numerical comparison technique to perform the digital-to-analog conversion without resort to less accurate conversion instruments.

Similar numerical comparison techniques are taught in the other embodiments of the invention wherein a variable digital-to-analog converter is described. The novel converter incorporates a variable oscillator which, in conjunction with a comparator, a counter, and a voltage generator for generating a predetermined waveform, converts digital signals of differing values to analog output signals. The novel apparatus of the present invention further incorporates a variable voltage generator, so that the amplitude of the analog voltage output per digital unit of input signal may be varied as desired.

It is apparent that a method and apparatus are provided which convert digital information to analog signals by a novel numerical comparison technique. By generating a train of pulses at a predetermined frequency and numerically comparing the number of pulses generated with the digital number to be converted, an output voltage signal may be generated having an amplitude proportional to the time necessary for the number of generated pulses to equal the digital number. Thus, the amplitude of the output voltage signal is directly related to the digital number.

Although particular embodiments of the invention have been described by way of example, it will be appreciated that the invention is not limited thereto. Accordingly, any and all modifications, alterations and equivalent arrangements falling within the scope of the following claims should be considered to be a part of the invention.

The embodiments of the invention in which an exclusive property or privilege is claimed are defined as follows:

1. The method of displaying numerical digital information representing range of a radar target comprising the steps of:
   numerically comparing said digital information with digital information represented by a train of pulses generated at a predetermined rate by a pulse generator;
   generating a first analog signal whose amplitude varies as a substantially linear function of time;
   generating a second analog signal only when said digital information and the information represented by said train of pulses are numerically substantially equal; and
   energizing display means with said first and second analog signals for displaying on a surface of said display means said radar target as a point, the distance of said point from predetermined references on said surface being a function of said radar target digital information.

2. The method of displaying range of a radar target from prestored digital information comprising the steps of:
   producing digital signals from digital information stored in storage means;
   numerically comparing said digital signals with digital signals represented by a train of pulses generated at a predetermined rate by a pulse generator;
   generating a first analog signal whose amplitude varies substantially as a linear function of time;
   generating a second analog signal only when said digital signals produced from said stored digital information and the digital signals represented by said train of pulses are numerically substantially equal; and
   energizing display means with said first and second analog signals for displaying on a surface of said display means said radar target as a point, the distance of said point from predetermined references on said surface being a function of said prestored radar target digital information.

3. The method of claim 2 wherein each digit of said prestored digital information represents a preselected distance of said radar target range, and wherein the predetermined rate of generating said train of pulses is a function of said preselected distance.

4. The method of claim 2 wherein each digit of said prestored digital information represents a distance substantially equal to one-eighth nautical mile, and said pulse generator generates 647,500 pulses per second.

5. The method of claim 3 wherein said display means is a cathode ray display tube having a phosphor-coated display surface, an electron gun for providing an electron beam and means for deflecting said beam, using said first analog signal for deflecting said beam and using said second analog signal for unblanking said beam.

6. The method of displaying range of a radar target stored in storage means in the form of digital signals comprising the steps of:
   comparing said digital signals with a linearly increasing numerical digital count; and
   energizing analog display means to display a point on the surface thereof only when the digital signals and said numerical digital count are numerically substantially equal, the point being displaced from predetermined references of said surface as a function of the time necessary for said linearly increasing numerical digital count to become substantially equal to said digital signals.

7. A method of converting digital information to analog signals comprising the steps of:

comparing a digital number with a digital count linearly increasing with time; and energizing analog signal producing means only when said digital number and said digital count are substantially numerically equal to produce an analog output signal, the amplitude thereof being proportional to the time necessary for said linearly increasing count to become substantially equal to said digital number.

8. A method of converting digital information to analog signals comprising the steps of:

energizing comparing means with said digital information and with a digital count from counting means, said digital count linearly increasing with time, and energizing analog signal producing means with a signal from said comparing means only when said digital information and said digital count are numerically substantially equal, said analog signal producing means producing an analog output signal, the amplitude of which is proportional to the time necessary for said digital count to change from zero to substantially being equal to said digital information.

9. A system for displaying numerical digital information representing range of a radar target comprising:

means for generating a train of pulses at a predetermined frequency;

means for numerically comparing said digital information with digital information represented by said train of pulses;

means for generating a first analog signal whose amplitude varies as a substantially linear function of time;

means for generating a second analog signal only when said digital information and the information represented by said train of pulses are numerically substantially equal; and display means energized by said first and second analog signals for displaying on a surface of said display means said radar target as a point, the distance of said point from predetermined reference on said surface being a function of said radar target digital information.

10. A system for displaying a radar target from a digital range signal comprising:

means for generating signals having a predetermined frequency;

means for counting said signals and producing a digital count signal representing the number of said signals counted;

comparing means energized by said digital range signal and by said digital count signal for numerically comparing said signals and providing an output signal only when said range signal and said count signal are numerically substantially equal; and display means connected to receive said output signal and comprising a display surface for displaying a point on said surface only when the signals compared by said comparing means are numerically substantially equal, the distance of said point from predetermined references of said surface being substantially proportional to said digital range signal representing the range of said radar target.

11. The system defined by claim 10 further including means for generating an analog signal whose amplitude varies substantially linearly as a function of time;

means for synchronizing actuation of said means for generating an analog signal and said means for counting; and means for providing said analog signal to said display means.

12. The system defined by claim 11 wherein said display means further comprises:

means for providing an electron beam;

means for deflecting said beam with said analog signal; and means connected to receive said output signal of said comparing means for unblanking said beam.

13. A system for displaying a radar target from a digital range signal comprising:

means for generating signals having a predetermined frequency;

means for counting said signals and producing a digital count signal representing the number of said signals counted;

comparing means energized by said digital range signal and by said digital count signal for numerically comparing said signals and providing an output signal when the compared signals are substantially equal;

means for generating an analog signal whose amplitude varies substantially linearly as a function of time;

means for synchronizing actuation of said means for generating an analog signal and said means for counting; and display means having a phosphor-coated display surface, an electron gun for providing an electron beam and means energized by said analog signal for deflecting said beam across said display surface with respect to predetermined references, said display means being further energized by the output signal of said comparing means for unblanking said beam to display said radar target on said display surface as a point whose distance from said predetermined references is proportional to the range of said radar target.

14. A system for displaying a radar target from a digital range signal comprising:

means for generating signals having a predetermined frequency;

means for counting said signals and producing a digital count signal representing the number of said signals counted;

comparing means energized by said digital range signal and by said digital count signal for numerically comparing said signals and providing an output signal when said compared signals are substantially equal;

means for generating an analog signal whose amplitude varies substantially linearly as a function of time;

means for synchronizing actuation of said means for generating an analog signal and said means for counting; and display means comprising a phosphor-coated display surface, an electron gun for providing an electron beam, beam deflecting means and beam unblanking means, said beam deflecting means being energized by said analog signal for deflecting said beam across said display surface with respect to predetermined references, and said beam unblanking means being energized by the output signal of said comparing means for unblanking said electron beam to display said radar target on said display surface as a point whose distance from said predetermined references is proportional to the range of said radar target.

15. The system defined by claim 14 wherein each digit of said digital range signal represents N nautical range miles and said predetermined frequency is substantially equal to $$\frac{80937.5}{N}$$

cycles per second.

16. A system for displaying a radar target from a prestored digital range signal comprising:

storage means for generating an output digital range signal representing a digital range signal stored therein;

means for generating signals having a predetermined frequency;

means for counting said signals and producing a digital count signal representing the number of said signals counted;

comparing means energized by said digital range signal and by said digital count signal for numerically comparing said signals and providing an output signal when said compared signals are substantially equal;

means for generating an analog signal whose amplitude varies substantially linearly as a function of time;

means for synchronizing actuation of said means for generating an analog signal and said means for counting; and display means comprising a phosphor-coated display surface, an electron gun for providing an electron beam, beam deflecting means and beam unblanking means, said beam deflecting means being energized by said analog signal for deflecting said beam across said display surface with respect to predetermined references, and said beam unblanking means being energized by the output signal of said comparing means for unblanking said electron beam to display said radar target on said display surface as a point whose distance from said predetermined references is proportional to the range of said radar target.

17. The system defined by claim 16 wherein each digit of said digital range signal represents N nautical range miles and said predetermined frequency is substantially equal to $$\frac{80937.5}{N}$$

cycles per second.

18. The system defined by claim 16 wherein said storage means comprise a digital computer.

19. A system for converting a digital signal to an analog signal comprising:

means for generating signals having a predetermined frequency;

means for counting said signals and producing a digital count signal representing the number of said signals counted;

comparing means energized by said digital signal and by said digital count signal for numerically comparing said signals and providing an output signal only when said digital signal and said count signal are numerically substantially equal;

means for generating an analog signal whose amplitude varies substantially linearly as a function of time;

means for synchronizing actuation of said means for generating an analog signal and said means for counting; and gating means for providing an analog output signal only when simultaneously being energized by said analog signal and by the output signal of said comparing means, the output signal of said gating means having an amplitude proportional to said digital signal.

20. The system defined by claim 19 wherein said predetermined frequency is variably controllable.

No references cited.

CHESTER L. JUSTUS, *Primary Examiner.*

R. D. BENNETT, *Assistant Examiner.*